United States Patent [19]

Pedersen et al.

[11] Patent Number: 4,827,800
[45] Date of Patent: May 9, 1989

[54] MULTI-GROOVE AND SPLINE CONNECTION BETWEEN GEAR SHAFT OF A ROTARY PISTON MACHINE WITH INTERNAL AXIS AND METHOD OF MAKING SUCH A MULTIGROOVE SPLINE CONNECTION

[75] Inventors: Poul H. H. Pedersen, Nordborg; Ivar Rasmussen, Sønderborg, both of Denmark

[73] Assignee: Danfoss A/S, Nordborg, Denmark

[21] Appl. No.: 217,042

[22] Filed: Jul. 11, 1988

Related U.S. Application Data

[63] Continuation of Ser. No. 543,820, Oct. 20, 1983, abandoned.

[30] Foreign Application Priority Data

Nov. 15, 1982 [DE] Fed. Rep. of Germany ....... 3242274

[51] Int. Cl.⁴ .......................... F16H 1/28; F16H 55/17
[52] U.S. Cl. .......................................... 74/805; 74/413; 74/462; 403/359; 418/61.3; 464/158
[58] Field of Search ................. 74/805, 390, 413, 438, 74/460, 462; 403/359; 464/158, 159; 418/61 B

[56] References Cited

U.S. PATENT DOCUMENTS

| | | | |
|---|---|---|---|
| Re. 25,291 | 12/1962 | Charlson | 418/61 B |
| Re. 28,933 | 8/1976 | Huber | 418/61 B |
| Re. 31,067 | 10/1982 | Robets | 418/61 B |
| 658,624 | 9/1900 | Egger | 403/359 X |
| 2,696,124 | 12/1954 | Flowers et al. | 403/359 X |
| 2,800,800 | 7/1957 | Dunn | 403/359 X |
| 2,800,802 | 7/1957 | Rentschler | 74/462 X |
| 3,233,524 | 2/1966 | Charlson | 418/61 B |
| 3,286,645 | 11/1966 | Albers | 418/61 B X |
| 3,606,598 | 9/1971 | Albers | 418/61 B |
| 3,799,201 | 3/1974 | Hansen et al. | 418/61 B |
| 4,051,744 | 10/1977 | Oshima | 74/462 X |
| 4,223,528 | 9/1980 | Vuilleumier | 74/462 X |
| 4,433,589 | 2/1984 | Chaconas | 74/438 |

FOREIGN PATENT DOCUMENTS

| | | | |
|---|---|---|---|
| 649072 | 12/1928 | France | 74/805 |
| 869633 | 2/1942 | France | 74/390 |

OTHER PUBLICATIONS

Waldron Gear Couplings Bulletin 712B, Nov. 1979, pp. 2, 16 and inside cover.

Primary Examiner—Dirk Wright
Assistant Examiner—William Gehris
Attorney, Agent, or Firm—Wayne B. Easton

[57] ABSTRACT

The invention relates to a multi-groove and spline connection between a gear and cardan shaft of a rotary piston machine with an internal axis, wherein external toothing at the head of the cardan shaft engages internal toothing of the gear and an axial abutment co-operates with the end face of the head. The abutment is such that it is only contactable by the teeth of the head of the cardan shaft.

2 Claims, 2 Drawing Sheets

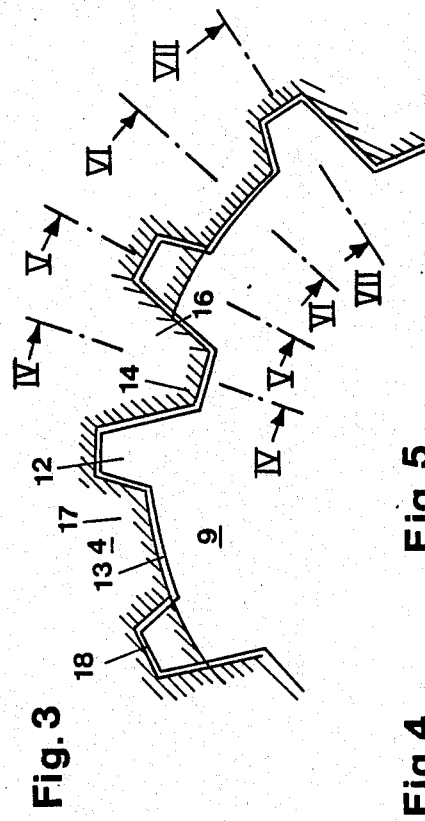

MULTI-GROOVE AND SPLINE CONNECTION BETWEEN GEAR SHAFT OF A ROTARY PISTON MACHINE WITH INTERNAL AXIS AND METHOD OF MAKING SUCH A MULTIGROOVE SPLINE CONNECTION

This application is a continuation of U.S. patent application Ser. No. 543,820, filed on Oct. 20, 1983, and now abandoned.

The invention relates a a multi-groove and spline connection between the gear and cardan shaft of a rotary piston machine with internal axis, wherein external toothing at the head of the cardan shaft engages internal toothing of the gear and an axial abutment co-operates with the end face of the head.

In known constructions of this kind (U.S. Pat. No. 3,286,645), the head of the cardan shaft engages the internal toothing only over part of the width of the gear. It is disposed between a wall of the housing through which the cardan shaft passes and a plug which is inserted in the interior of the interal toothing and the end of which forms the abutment. Because of the tilting movement of the cardan shaft, the grooves and splines of its head are curved. The grooves and splines of the internal toothing are rectilinear and parallel to the axis over the entire width of the gear. The depth of the grooves is sufficiently large to remain in permanent contact with the splines of the head of the cardan shaft.

For reasons of rationalisation, the same cardan shafts but gears of different width are employed for rotary piston machines of different capacities. Adaptation is achieved by plugs of different length. Accordingly, it is necessary not only to produce gears with a width depending on the capacity but also plugs with different lengths and to fit these appropriately during assembly.

The invention is based on the problems of providing a multi-groove and spline connection of the aforementioned kind in which the manufacture of differently long plugs and their association with the gears can be dispensed with.

This problem is solved in that the abutment is formed by at least one step extending centrally of the width of the gear from the peak of the spline or the base of the groove of the internal toothing.

In this construction, the abutment is formed by one or more steps made in one piece with the internal toothing. The plugs can be omitted completely. Nor is it necessary to select a plug to suit the width of the gear. Instead, the abutments are located at the correct position right from the start in the case of every gear. With a series of gears of different width, it is even possible to produce the steps in the same manner.

Since no large axial forces have to be absorbed, comparatively small step faces will suffice. In particular, it is not necessary to extend the step faces right up to the central axis of the gear. Few alterations in the vicinity of the internal toothing will therefore be sufficient. The measures required for producing the steps are therefore not expensive.

In a preferred embodiment, at least one step extending from the base of the groove extends over only part of the maximum spline height. Such small steps are sufficient as an abutment.

In a preferred solution, at least one step extending from the peak of the spline projects radially inwardly over the external toothing of the head of the cardan shaft. Such steps likewise have a comparatively small but adequate area.

It is also advisable for the number of splines of the internal toothing to be twice the number of teeth of the gear and for the splines to have alternatively different heights and to co-operate with grooves of different heights at the head of the cardan shaft. This ensures that the cardan shaft and gear will always be in the correct relationship to each other during assembly. Consequently, there will be no control errors during operation of the distributing valve connected to the cardan shaft. The different working on the splines presents no difficulties because the internal toothing will in any case require a special operation to form the steps.

In particular, the steps may terminate at the height of the smaller splines. This simplifies production still further.

A preferred method for making the multi-groove and spline connection resides in that at least one step is produced by cold deformation of the gear. Such treatment may not bring about very much displacement of the material. However, cold deformation is best suited for producing the steps which are in any case very small.

A gear may first be made with axially throughgoing internal toothing and then at least one step is provided by cold deformation. In this way, adequately deep grooves can be provided and yet the steps formed in a simple manner. This method is particularly suitable if the steps extend over only part of the maximum spline height because in this case slight deformation of the material will be sufficient.

Another preferred method of making the multi-groove and spline connection resides in that axially throughgoing internal toothing is made with at least one spline which projects radially inwardly over the external toothing of the head of the cardan shaft, and hollowing out is then performed over part of the width of the gear by turning with a substantially larger radius than the inner radius of the external toothing. In this case, the internal toothing is first made in conventional manner, at least some of the splines having a larger height. Hollowing out by turning then forms the step on the projecting spline sections.

Preferred examples of the invention will now be described in more detail with reference to the drawing, wherein:

FIG. 3 is a diagrammatic part-section of the multi-groove and spline connection of FIG. 1;

FIG. 4 is a part-section on the line IV—IV in FIG. 3 with the cardan shaft pulled out;

FIG. 5 is a part-section on the line V—V in FIG. 3;

FIG. 6 is a part-section on the line VI—VI in FIG. 3;

FIG. 7 is a part-section on the line VII—VII in FIG. 3, and

Figure 1:
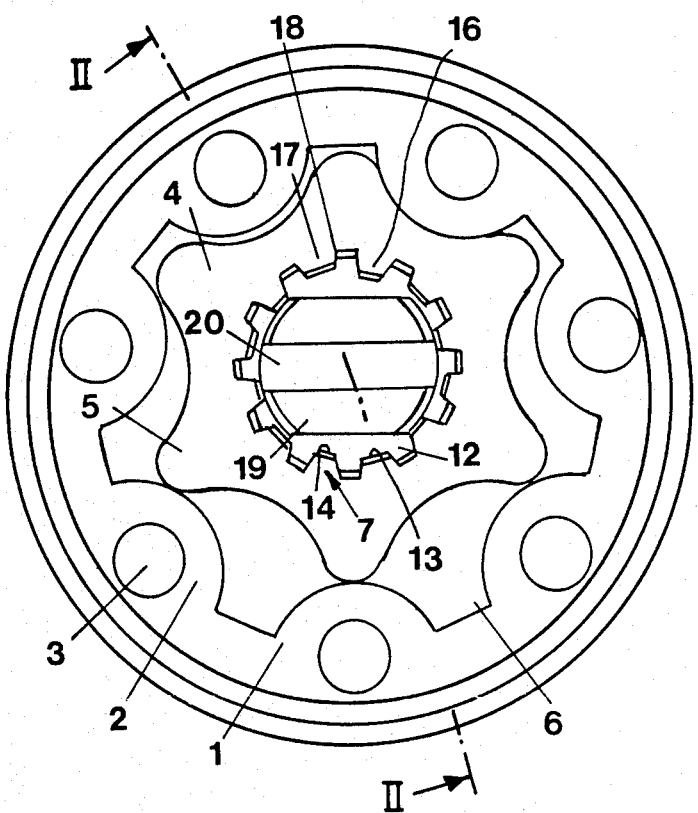
FIG. 1 is a side elevation of the cardan shaft, gear and gear ring of a rotary piston machine with internal axis.
Figure 2:
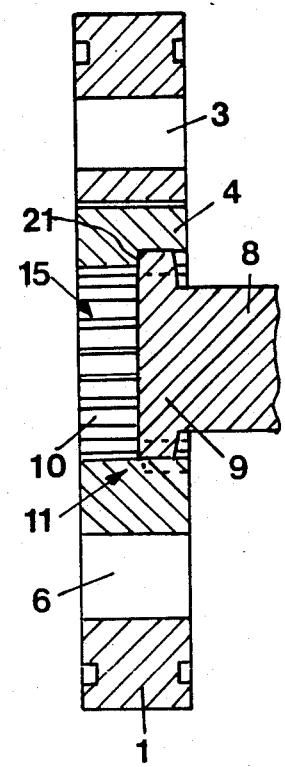
FIG. 2 is a section on the line II—II in FIG. 1.

The embodiments of FIGS. 1 to 7 comprise a gear ring 1 with seven inwardly directed teeth 2 and throughgoing holes 3 for clamping screws and a gear 4 with six outwardly directed teeth 5, compression chambers 6 being formed between the teeth of the gear ring 1 and gear 4. In the present example, it is assumed that the gear ring 1 is stationary and that the gear 4 rotates and planetates in relation thereto. However, it is also possible for the gear 4 only to planetate and for the gear ring 1 to rotate.

The gear 4 is connected by a multi-groove and spline connection 7 to a cardan shaft 8 having a head 9 engaging in a throughgoing aperture 10 of the gear. The head 9 has external toothing 11 comprising twelve splines 12 of equal outer diameter and six grooves 13 (formed on a reference circle) of shallower depth alternating with six grooves 14 (formed on an inner circle) of higher depth. The throughgoing aperture 10 contains internal toothing 15 in which six higher splines 16 alternate with six shorter splines 17, twelve grooves 18 (formed on an outer circle) of equal outer diamter being defined between the splines. The end 19 of cardan shaft 8 opposite to the head 9 comprises a transverse slot 20 which can engage over an entrainment pin.

Since the head 9 of cardan shaft 8 can be inserted in gear 4 only in positions displaced through 60°, one ensures that the transverse slot 20 will always assume a defined position in relation to the teeth 5 of gear 4.

Every second groove 18 has a step 21 centrally of the width of the gear 4. This step 21 extends from the base 22 of the groove only up to the peak of the spline 17, i.e. only over part of the maximum spline height given by the spline 16. Accordingly, the splines 12 of cardan shaft 8 have a shallower height on one side (FIG. 6) than on the other side (FIG. 6). In operation, the end face 23 of every second spline abuts a step 21 so that the desired abutment effect is produced.

In the production of the internal toothing 7 of gear 4, the method can be such that a cylindrical throughgoing hole is first produced and its circumference is then given the desired profiling (splines, grooves, steps) by cold deformation. It is also possible first to produce axially throughgoing internal toothing and then merely displace the material necessary for producing the steps 21 by cold deformation. Since it is only important to ensure that the splines and grooves of the internal toothing are precisely formed where the head 9 of cardan shaft 8 engages, one can employ material from the remainder of this toothing during the cold deformation or compress it in this zone.

Figure 8:
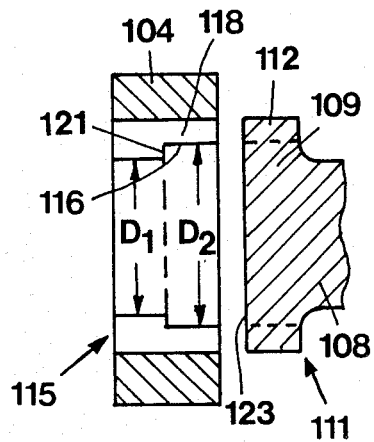
FIG. 8 is a part-section of a modified embodiment with the cardan shaft pulled out.

In the FIG. 8 embodiment, the same reference numerals increased by 100 are used for corresponding parts. In this case, the steps 121 extend from the peak of the splines 116. They therefore project radially inwardly over the internal toothing 115 and can co-operate with the entire end of the head 109.

Production can be such that internal toothing 115 is first produced with axially throughgoing splines which at least partially have an internal diameter $D_1$. The internal toothing 115 is then machined out over the desired width to produce the steps 121.

There are also other ways of forming the steps. For example, the steps may extend radially outwardly from the base of the grooves by appropriately machining the gear. In this case, the head of the cardan shaft would need to have slines which project axially over the steps and have radial projections co-operating with the steps.

The gears could also be produced in different ways, for example by sintering.

We claim:

1. A gear and cardan shaft arrangement, comprising, an internally toothed gear element having internal splines extending radially between inner dedendum and outer addendum circles said internal splines extending axially all the way through said gear element, a cardan shaft having a head element with external teeth between corresponding ones of said inner dedendum and outer addendum circles, a reference pitch circle for said gear and shaft head elements between said inner dedendum and outer addendum circles having the same nominal diameter for said gear element and said head element, said gear element having an abutment face between the opposite sides thereof extending circumferentially between at least one adjacent ones of said splines thereof and radially only between said inner dedendum and outer addendum circles such that said abutment face is only contactable by said teeth of said head element.

2. A gear and cardan shaft arrangement according to claim 1 wherein said abutment face extends radially only between said outer addendum circle and said reference pitch circle.

* * * * *